April 18, 1939.  M. D. OUTER  2,154,577
KEYBOARD FOR A SHORTHAND OR STENOGRAPHIC TYPEWRITING MACHINE
Filed Jan. 13, 1938
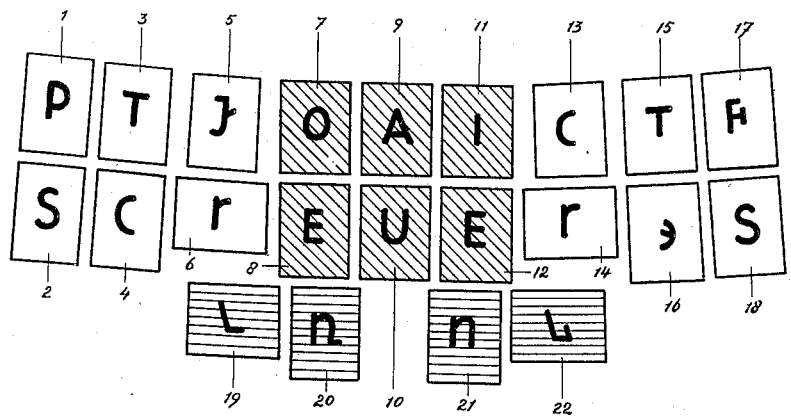
M. Den Outer
INVENTOR
By: Glascock Downing & Seebold
Attys.

Patented Apr. 18, 1939

2,154,577

UNITED STATES PATENT OFFICE 2,154,577

KEYBOARD FOR A SHORTHAND OR STENOGRAPHIC TYPEWRITING MACHINE

Marius den Outer, Rijswijk, Netherlands, assignor to Naamlooze Vennootschap Velotype Systeem den Outer, Rotterdam, Netherlands, a corporation of the Netherlands Application January 13, 1938, Serial No. 184,868
In the Netherlands January 27, 1937

3 Claims. (Cl. 197—100)

The invention relates to improvements in the keyboards of shorthand or stenographic typewriting machines and more particularly in shorthand-keyboards of the kind comprising in its centre at least four keys for vowels bordering at the left hand side on a group of keys for initial consonants arranged in at most three vertical rows and at the right hand side on a group of keys for final consonants arranged in a similar way, whilst in front of the group for the vowels another row of four keys is provided. In keyboards of this known kind it is intended to operate the groups of the consonants by the little finger, the ring-finger and the middle-finger of the left hand and right hand, whereas the centrally located group for the vowels should be operated by the fore-fingers. This emanates from the idea that the keys for the vowels, which in the principal languages among all letters or sounds most frequently occur, should be operated by those fingers of the human hand which generally possess the greatest readiness and suppleness for such operation, i. e., by the fore-fingers. The horizontal row of four keys situated in front of the vowels is operated by the two thumbs.

One object of the invention is to improve the shorthand-keyboards of this kind and to arrange the keys in such a manner and in such mutual relationship that they are very easily operable by the fingers of the human hand without needing frequent and important changes in the position of said fingers, so as to enable a great speed in writing and to prevent tiredness of the operator when typewriting with the machine even with a very great speed.

Another object of the invention is to pay full regard to the activeness and readiness of each special finger of the hand and thus to arrange the keys in such groups that the most active fingers of the hands have to operate those keys comprising the characters which most frequently occur, whereas the less active fingers, and especially the thumbs, are destined for the keys which are not so much needed.

A still further object of the invention is to reduce the number of keys on the keyboard as much as possible and to obtain nevertheless a clear and readily legible writing.

In keyboards of the above mentioned known kind the keys, except those for the thumbs and the little fingers, are arranged in three horizontal rows. This presents the disadvantage that an easy and quiet operation of said keys by the corresponding fingers is not possible, because the positions of the fingers are too much subjected to alterations in vertical direction, according to the location of the special key which has to be depressed every time. A further difficulty is that, since the vowel-group comprises only four vowels, which is too small a number to obtain a readily legible writing, the group of keys lying in front of the vowel-group has to comprise besides two consonants two more vowels. Consequently not all vowels are assembled in the group of keys to be operated by the fore-fingers, and this not only causes the thumbs to be relatively too much occupied, but it is also a drawback in learning quickly how to write with the machine and in obtaining a great speed of writing.

The keyboard according to the invention obviates the above mentioned disadvantages. To this effect the group for the vowels comprises at least five keys and in each group for the consonants the keys are arranged in two horizontal rows, whilst the group of four keys in front of the vowels exclusively consists of keys for consonants which are missing in the groups for the consonants.

Thus the least suitable fingers of the hand (little finger, ring-finger, middle-finger) have to actuate only two keys in a vertical row, which causes an easier and more accurate stroke by these fingers. The keys for the vowels are now exclusively operated by the fore-fingers, and it is of no importance that each of these fingers must be able to operate more than two keys, because the fore-fingers have a sufficient readiness and suppleness for such operation. The thumbs only have to operate those keys for consonants which are missing in the consonant-groups.

In keyboards of the known type mentioned above the keys of the group lying in front of the vowel-group are formed in such a manner that with each thumb two keys can be depressed simultaneously. This is necessary, because it often occurs that the vowels and consonants represented by this group simultaneously appear at the beginning or the end of a word or syllable. Consequently it is impossible for the thumbs to take a quiet position during shorthand-writing, for each thumb should be able to take three positions, viz. two positions for striking the keys of each group separately and another definite position for simultaneously depressing the two keys of such a group. By this the thumbs are too much fatigued and wrong strokes are thus easily possible.

According to the invention this can be obviated in that the group of four keys lying in front of the vowels consists of keys for liquid consonants. As is known, the liquid consonants (M, N, NG, L, R) are consonants which in the principal languages very seldom occur simultaneously at the beginning or the end of a word or syllable. In composing the group of keys in front of the vowels exclusively of liquid consonants, the advantage is obtained that the thumbs will have to depress only in very exceptional cases two keys of this group simultaneously, and consequently a much more quiet position of the thumbs is obtained.

This effect can still be improved, if according to the invention the liquid consonants in the said group of four keys are constituted in the sequence from the left to the right by the characters: L, N, N, L. In the group of liquid consonants namely the combination L, N at the beginning of a word or syllable and N, L at the end of a word or syllable never occur. The said arrangement of the liquid consonants moreover presents the great advantage that the keys for each thumb-group may be provided in stepped relation so as to enable a readier placing of the thumbs, which results in a greater speed and more certainty of striking the exact key.

By the invention a keyboard for a stenographic machine is realized meeting all the demands which may be made in connection with an easy location of the fingers and an unconstrained and appropriate actuation of the keys, so that a very great speed can be obtained with the machine.

Keyboards for shorthand typewriting machines are known, in which the keys are grouped very simply, i. e., in two horizontal rows of 10 keys each, so that each finger has to operate merely two keys lying above each other, but these keyboards do not only comprise a too small number, viz., 20 keys, which is insufficient to obtain a distinctly legible writing, but moreover the keys for the vowels are located in such a manner, that they have to be operated by the thumb, the forefinger and the middle-finger of the right hand. This is also applicable to the known shorthand-writing machine of Grandjean.

In other known keyboards for shorthand typewriting machines it has been proposed to provide in front of the two rows of keys, each comprising 8 or 10 keys, an additional group of four or more keys to be operated by the thumbs, but in all these cases this additional group comprises only vowels, whereas the other keys are destined for consonants. The vowels have thus to be operated by the thumbs, which is inappropriate, because, as has been remarked above, these frequently occurring keys should be preferably operated by the fore-fingers. This is also true for a known keyboard in which the vowels are situated in the centre, but in which there is no additional group of keys in front of these vowels.

In the accompanying drawing an embodiment of a keyboard according to the invention has been illustrated by way of example. This keyboard consists of 22 keys, which are indicated by the reference numbers 1–22. The vowel-group comprising six vowels, has been indicated in the drawing by an oblique hatching. The consonant-groups situated on either side of the vowel group and each comprising six keys arranged in two horizontal rows, are not hatched, whereas the four keys of the additional group of keys in front of the vowel-group are indicated by a horizontal hatching.

By the left hand the following keys are operated:
Little finger—the keys 1 and 2
Ring-finger—the keys 3 and 4
Middle-finger—the keys 5 and 6
Fore-finger—the keys 7, 8 and 9 or 10
Thumb—the keys 19 and 20

By the right hand are operated:
Little finger—the keys 17 and 18
Ring-finger—the keys 15 and 16.
Middle-finger—the keys 13 and 14
Fore-finger—the keys 11, 12 and 9 or 10
Thumb—the keys 21 and 22.

The group of the keys 1–6 comprises the initial consonants, the group of the keys 7–12 the vowels and the group of the keys 13–18 the final consonants. These groups are arranged together in two horizontal or more or less curved rows, each of nine keys. In front of these rows on either side of the centre the keys 19, 20 and 21, 22 are provided, which keys indicate characters from the group of the liquid consonants, preferably in sequence from the left to the right the characters L, N, N, L.

The missing consonants are obtained by combination of the other ones. For the initial consonants in the following manner:

$$B = P + J$$
$$D = T + J$$
$$G = C + J$$
$$H = J + L$$
$$M = r + n$$
$$V = L + r$$
$$W = J + L + r$$

Further no difference is made between the initial consonants F and V, Y and J, K and C, Z and S, whilst the Q and X are represented by the consonants $C + V$ and $C + S$ respectively.

The missing final consonants are represented as follows:

$$G = C +,$$
$$m = n +,$$
$$P =, + F$$
$$W = L + r$$

Further the following final consonants are used for each other: $B = P$, $D = T$, $K = C$, $Z = S$, $X = CS$ and $Y = J =,$.

The characters are preferably shaped in such a manner that the combinations made with these characters give as much as possible the visual impression of the missing characters on the keyboard. For that reason the small types are used for the consonants r and n. By combination may be formed for instance: $m = r + n$, $V = L + r$, etc.

Above the keyboard the sequence in which the characters are printed upon the band of paper is shown in the drawing.

Having herein described the invention what is claimed and desired to secure by Letters Patent is:

1. In a keyboard for a shorthand or stenographic typewriting machine, a group of at least five keys for vowels situated in the central part thereof, said central group bordering at the left hand side on a lateral group of keys for initial consonants arranged in at most three vertical and in two horizontal rows, and at the right hand side on a second lateral group of keys for final consonants arranged in the same way, an additional horizontal row of four keys being provided in front of the central group for the vowels, said additional group comprising exclusively keys for liquid consonants.

2. In a keyboard for a shorthand or stenographic typewriting machine, a group of at least five keys for vowels situated in the central part thereof, said central group bordering at the left hand side on a lateral group of keys for initial consonants arranged in at most three vertical and in two horizontal rows, and at the right hand side on a second lateral group of keys for final consonants arranged in the same way, an additional horizontal row of four keys being provided in front of the central group for the vowels, said additional group comprising from the left to the right keys for the characters: L, N, N, L.

3. In a keyboard for a shorthand or stenographic typewriting machine an arrangement of the keys in two substantially horizontal rows, each of nine keys, and another substantially horizontal row of four keys situated in front thereof, the first mentioned two rows comprising a group of six keys for vowels in the centre, a group of six keys for initial consonants at the left hand side and a group of six keys for final consonants at the right hand side, the row of four keys situated in front of the said two rows comprising from the left to the right keys for the characters L, N, N, L.

MARIUS DEN OUTER.